(12) United States Patent
Barati et al.

(10) Patent No.: US 8,337,795 B2
(45) Date of Patent: Dec. 25, 2012

(54) PRODUCTION OF HIGH PURITY SILICON FROM AMORPHOUS SILICA

(75) Inventors: Mansoor Barati, Toronto (CA); Kingsley Kweku Larbi, Etobicoke (CA); Raja Roy, Mississauga (CA); Vaikuntam I. Lakshmanan, Mississauga (CA); Ramamritham Sridhar, Mississauga (CA)

(73) Assignee: Process Research Ortech Inc., Mississauga, Ontario (CA)

( * ) Notice: Subject to any disclaimer, the term of this patent is extended or adjusted under 35 U.S.C. 154(b) by 184 days.

(21) Appl. No.: 12/862,925

(22) Filed: Aug. 25, 2010

(65) Prior Publication Data

US 2011/0052475 A1 Mar. 3, 2011

Related U.S. Application Data

(60) Provisional application No. 61/236,697, filed on Aug. 25, 2009.

(51) Int. Cl.
*C01B 33/02* (2006.01)
(52) U.S. Cl. .................. 423/350; 423/348; 423/349
(58) Field of Classification Search ........... 423/348–350
See application file for complete search history.

(56) References Cited

U.S. PATENT DOCUMENTS

| 4,214,920 A * | 7/1980 | Amick et al. | 438/57 |
| 2009/0010833 A1* | 1/2009 | Rosenband et al. | 423/349 |
| 2011/0206592 A1* | 8/2011 | Laine et al. | 423/350 |

FOREIGN PATENT DOCUMENTS

| IN | 158579 | * | 9/1982 |

OTHER PUBLICATIONS

Hussain et al., "Extraction of Silicon from Rice Husk Ash", The Arabian Journal for Science and Engineering, vol. 15, No. 3, Jul. 1990 479-486.*
Banerjee et al., "Investigations on the Production of Silicon from Rice Husks by the Magnesium Method", Materials Science and Engineering, 52 (1982) 173-179.*
Swatsitang et al., "Preparation of Silicon from Rice Hulls", Technical Digest of the International PVSEC-14, Bangkok, Thailand, 2004. 301-302.*
Mishra et al., "Production and purification of silicon by calcium reduction of rice-husk white ash", Journal of Materials Science 20 (1985) 4387-4391.*
Hunt et al., "Rice Hulls as a Raw Material for Producing Silicon", Journal of the Electrochemical Society, 131 (7), 1683-1686, Jul. 1984.*
Ikram et al., "X-ray diffraction analysis of silicon prepared from rice husk ash", Journal of Materials Science 23 (1988) 2379-2381.*
Sun et al., "Silicon-Based Materials from Rice Husks and Their Applications", Ind. Eng. Chem. Res. 2001, 40, 5861-5877.*

\* cited by examiner

*Primary Examiner* — Colleen Dunn
*Assistant Examiner* — Anthony J Zimmer
(74) *Attorney, Agent, or Firm* — Michael I. Stewart; Sim & McBurney

(57) ABSTRACT

A process to the production of silicon from amorphous silica is disclosed. The amorphous silica is formed from a material rich in silica, especially rice husk ash or silica fume. The process comprises subjecting the amorphous silica to leaching with a lixiviant of aqueous mineral acid, especially hydrochloric acid. Preferably, material rich in silica is roasted at a temperature of not more than 850° C., subjected to leaching and then subjected to a second roasting at a temperature of less than 750° C. The process provides for the production of high purity silicon, especially to the production of solar grade silicon (SoG-Si).

15 Claims, No Drawings

US 8,337,795 B2

PRODUCTION OF HIGH PURITY SILICON FROM AMORPHOUS SILICA

FIELD OF THE INVENTION

The present invention relates to a process for the production of high purity silicon from a material rich in silica, especially from rice husks or silica fume, and to the production of solar grade silicon (SoG-Si).

BACKGROUND TO THE INVENTION

The search for economical methods to produce silicon for photovoltaic applications has been ongoing for over three decades. The sources of raw materials for these methods have been largely limited to silica in the form of quartz and volatile compounds of silicon, with limited examination of rice husk as the source of silicon. The processing methods that have received the most research attention have been the upgrading of metallurgical grade silicon by modification of conventional production methods and by pyrolytic decomposition of halosilanes i.e. the so-called Siemens Process. These two methods are commonly referred to as the metallurgical and chemical routes to solar grade silicon (SoG-Si) synthesis.

Although the chemical route has been used successfully to meet and exceed the typical purity requirements for SoG-Si, the potential for lowering costs and increasing the volume of production has been very limited. The unit processing steps involved in the chemical route approach can be complex, energy intensive and of long duration, as is discussed by Braga A. F. B, Moreira S. P, Zampieri P. R, Bacchin J. M. G, Mei P. R: "New Processes for the Production of Solar grade Polycrystalline Silicon—A Review", Solar Energy Materials and Solar Cells, Vol. 92(2008) pp 418-424.

A metallurgical route combined with directional solidification has been successful in removing metallic impurities with low segregation coefficients from silicon. However, this route has been ineffective economically in removing high segregation impurities e.g. B, P, Al. The latter are known to be very deleterious to the performance of solar cells, as is discussed in Istratov A. A, Buonassisi T, Pickett M. D, Heuer M, Weber E. R. "Control of impurities in "dirty" multicrystalline silicon for solar cells" Materials Science and Engineering B 134(2006) Elsevier B. V. pp 282-286. Thus, the logical and consequently typical approach has been to use very high purity silica and reductant raw materials that are almost free of high segregation impurities.

Rice husk is a waste by-product of the rice milling industry. The rice husk constitutes about 20% by weight of a rice paddy. The mineral ash content is 15-30% of the rice husks, of which 87-97% is amorphous silica. An estimated eighty million ($80 \times 10^6$) metric tonnes of rice husk are generated worldwide annually. The economic potential of utilizing this large amount of waste rice husk has attracted several research interests in recent years, including processing rice husk into other value added products e.g. as purified silica, carbides and nitrides of silicon, and insulating material in the steel industries.

A method of obtaining silicon of 6N (99.9999%) purity by reducing white rice husk ash with magnesium at a temperature of 800° C. followed by several successive acid leaching treatments is reported by Singh Rajvir and Dhindaw B. K, "Production of High Purity Silicon for Use in Solar Cells" Sun, Mankind's Future Source of Energy. edited by Francis de Winter and Michael Cox, Vol. II (1978), pp 776-781, Pergamon Press 1978, authored by International Solar Energy Society (ISES). The possibility of obtaining silicon of similar purity by direct smelting of purified amorphous silica with carbonaceous reductants in an electric furnace followed by leaching with acids, and repeating the steps about nine times, was also suggested. The method used to analyze the 6N silicon was not reported. However, the cost of such repeated smelting and leaching would be expected to prohibit use of this method as a low cost alternative to conventional methods.

U.S. Pat. No. 4,214,920 of Amick et al describes a method for producing high purity silicon from rice husks by coking leached rice hulls, adjusting the carbon:silica ratio to 2:1 followed by thermal reduction. Hunt, L. P. Dismukes, J. P. Amick, J. A. Schei, A. and Larsen, K. "Rice Hulls as a Raw Material for Producing Silicon" J. Electrochem. Soc. 131, No. 7 (1984.) pp 1683-1686 investigated the possibility of producing high purity silicon from rice husk by purifying rice husk silica according to the above method of Amick et al, followed by pelletizing and reduction in a modified electric arc furnace. The pelletizing was carried out using carbon black as a reductant and sucrose as a binder. Modifying the electric arc furnace was essential to minimize or eliminate possible contamination from the furnace atmosphere.

Bose D. N, Govindacharyulu P. A, Barnejee H. D "Large Grain Polycrystalline Silicon from Rice husk, Solar Energy Materials, Vol. 7 (1982) North Holland Publishing Company pp 319-321 subjected powdered silicon obtained by magnesium reduction of rice husk ash to melting and directional solidification. It was found that boron was the active impurity in the polycrystalline silicon ingot that was obtained. It was also determined that the minority carrier life time of the polycrystalline silicon material was of the order of 1-5 µs, and thus promising for photovoltaic applications. However, it has been subsequently estimated that the minimum carrier lifetime requirement for efficient solar cells fabricated from multicrystalline silicon wafers is 25 µs. The formation of crystalline silicon by heating a silicon precursor e.g. silicon dioxide, with an ingredient that will generate an exothermic reaction when heated e.g. magnesium, and isolating crystalline silicon is described in US published application 2009/0010833 of Rosenband V. et al, published 8 Jan. 2009.

The magnesium reduction of rice husk ash has also been reported by Banerjee H. D, Sen S., Acharya H. N: "Investigations on the Production of Silicon from Rice Husk by the Magnesium Method", Materials Science and Engineering, 52 (1982) pp 173-179. Acid leached rice husk ash was reduced by a method involving intimately mixing the ash with magnesium powder and firing the powdered mixture at temperatures between 500-600° C. in a sealed graphite crucible in a muffle furnace. The reaction product was successively leached in mineral acids (HCl, $H_2SO_4$, and HF) in a Teflon™ beaker. Some degree of crystallinity in the muffle furnace-fired rice husk silica was reported. Spectrochemical analysis of the final silicon product showed high contents of boron (20-200 ppm), magnesium (50-1000 ppm) and aluminum (10-200 ppm). The contamination of the silicon was attributed to the use of laboratory grade magnesium and laboratory glassware. Nazma Ikram, and Akhter M, "XRD Analysis of Silicon Prepared from Rice Husk Ash", Journal of Materials Science, vol 23 (1988), pp 2379-2381 reported a similar approach but using 4N purity magnesium; the silicon obtained was of 99.95% purity with a boron content of approximately 2 ppm. It was concluded that the silicon could be upgraded to solar grade silicon by conventional refining methods.

Calciothermic reduction of purified rice husk ash was reported by Mishra P, Chakraverty A., Banerjee H. D; Production and Purification of Silicon by Calcium Reduction of Rice Husk White Ash, Journal of Materials Science, vol 20

(1985) pp 4387-4391. A stoichiometric composition of granular calcium and purified rice husk silica was mixed, and the powdered mixture obtained was fired in a sealed sillimanite crucible in a muffle furnace at a temperature of about 720° C. The reduction product was milled to fine powder and successively leached with concentrated nitric acid ($HNO_3$) and hydrofluoric acid (HF) to obtain silicon of 99.9% purity with boron content of 10 ppm. It was suggested that the use of MgO-coated crucibles and high purity reagent could lead to the production of solar grade silicon by this method.

Silica fume is a byproduct of the silicon and ferrosilicon production industry. It is high purity silica (+90%) in the amorphous form. Use of silica fume as the feedstock for solar grade silicon synthesis has not been reported.

With respect to operation of economical commercial-scale processes for the production of solar grade silicon, it is believed that improvements are required in the methods described above. For instance, combustion of rice husk has been generally carried out in reactors with high temperature and long residence time, which results in formation of crystalline silica in the ash, which is a known carcinogen. Therefore, treatment or use of the ash from the conventional processes is limited.

A process for the synthesis of high purity silicon, including so-called SoG-Si, with high volume of production at low cost would be desirable.

SUMMARY OF THE INVENTION

The present invention provides an alternative method for the production of silicon that has high purity.

Accordingly, the present invention provides a process to the production of silicon from an amorphous silica, said amorphous silica having been formed from a material rich in silica, said amorphous silica being wettable, comprising the step of subjecting the amorphous silica to a purification step in which the amorphous silica is leached with a lixiviant of aqueous mineral acid. In embodiments, the amorphous silica has a loss of ignition content of less than 0.6% by weight.

In a preferred embodiment of the process of the present invention, the mineral acid is selected from the group consisting of at least one of hydrochloric acid, sulphuric acid, acetic acid, citric acid, hydrofluoric acid, nitric acid and perchloric acid. Preferably, the mineral acid is a mixture of hydrochloric acid and acetic acid.

In another embodiment, the amorphous silica has been formed by roasting of the material rich in silica at a temperature of not more than 850° C. Preferably, the amorphous silica is rice husk ash. In particular, the amorphous silica is rice husk ash, said rice husk ash having been formed by roasting of rice husks at a temperature of not more than 830° C. The amorphous silica may also be silica fume.

In a further embodiment, the mineral acid contains at least one metal chloride selected from the group consisting of alkaline earth metal chlorides and ferric chloride. The preferred alkaline earth metal chloride is magnesium chloride.

In yet another embodiment, the amorphous silica has a loss on ignition content of less than 0.2% by weight.

The present invention also provides a process for the production of silicon from a material rich in silica comprising the steps of:
a) subjecting the material rich in silica to roasting at a temperature of not more than 850° C. for a first period of time, said temperature and first period of time being selected so that silica so obtained is amorphous;
b) subjecting the amorphous silica obtained in step a) to a purification step in which the amorphous silica is leached with a lixiviant of aqueous mineral acid; and
c) subjecting the leached amorphous silica obtained in step b) to a second roasting at a temperature of less than 750° C. for a second period of time;

step a) preferably being controlled so that the amorphous silica so obtained has a loss on ignition (LOI) of less than 0.6% by weight and so that the amorphous silica is wettable.

In a preferred embodiment, the material rich in silica is rice husk or silica fume.

In another preferred embodiment, the amorphous silica subjected to the leach of step b) has a loss on ignition of less than 0.2% by weight.

In yet another embodiment, the amorphous silica obtained from step c) is subjected to metallothermic or carbothermic reduction to form crystalline silicon. Preferably, the metallothermic reduction is carried out in the presence of at least one metal selected from the group consisting of magnesium, calcium, and aluminum. Magnesium is preferred. In a preferred embodiment, the metallothermic reduction is carried out at a temperature sufficient to enable exothermic reaction between the amorphous silica and the reductant metal. The preferred temperature is greater than 550° C. Preferably, the carbothermic reduction is carried out in the presence of at least one selected from consisting of carbon black, graphite, char, coal, coke, and residual biomass in rice husk. In preferred embodiments, the carbothermic reduction is carried out at temperatures above 1600° C.

In a further embodiment, the metallothermic reduction is carried out in the presence of inert gas selected from the group consisting of argon and helium, especially argon.

In another preferred embodiment, the reduced amorphous silica so obtained from metallothermic reduction is subjected to at least one additional leaching step to purify the silicon product obtained.

In a further preferred embodiment, the additional leaching step is conducted using at least one acid selected from the group consisting of hydrochloric acid, sulphuric acid, acetic acid, citric acid, hydrofluoric acid, nitric acid and perchloric acid.

In a further preferred embodiment, the leach residue is melted, preferably in the presence of a slag at temperatures above 1410° C. In particular, the slag contains at least one of the group CaO, $Al_2O_3$, $SiO_2$, MgO, $CaF_2$, and BaO.

DETAILED DESCRIPTION OF THE INVENTION

The invention is directed to the production of silicon, especially high purity silicon from a material rich in silica, and in particular from materials with silica as the major constituent, such as rice husks, silica fume and fumed silica. In embodiments, the high purity silicon obtained is solar grade silicon (SoG-Si). The preferred material rich in silicon is rice husks, and therefore the invention will be particularly described herein with reference to the production of silicon, especially high purity silicon, from rice husks. However, it is to be understood that the process is also applicable to production of silicon from other materials rich in silica.

The present invention provides a process to the production of silicon from an amorphous silica, especially silica obtained from rice husks. The rice husks, in the form of rice husk ash, are subjected to a leaching step using a mineral acid. Subsequently, the leached rice husk ash is subjected to a reduction by a metal, alloy, or carbon-bearing material, e.g. metallothermic or carbothermic reduction, to convert silica to silicon. The silicon thus obtained may be subjected to further processing steps for further purification. Rice husk ash is obtained from rice husks by roasting; in a preferred embodiment, the leached rice husk ash may be subjected to a further roasting step prior to reduction.

It is understood that silica fume may be used in the process. In such a case, it is not necessary to subject the silica fume to a roasting step prior to leaching, as silica fume is in the form of the oxide. Moreover, the silica present in industrial by-products such as silica fume may be in the form of amorphous silica.

To obtain rice husk ash, raw rice husk is subjected to high temperature (primary) roasting of rice husks at a temperature of not more than 850° C. The period of time at the high temperature may be varied but is typically from a few seconds to about one minute. It is preferred that the rice husks be agitated for uniformity of temperature during the primary roasting. The silica suitable for leaching in the leaching step is in the form of amorphous silica, not crystalline silica. At temperatures above about 850° C., and especially above about 900° C., silica tends to crystallize or become fused, resulting in silica that is not amorphous silica. The resultant silica has poorer wettability. In addition, crystalline silicates may be health hazards. The time of heating at temperatures of not more than 850° C., and the temperature, should be controlled to prevent formation of crystallized or fused silica. It is preferred that the upper limit of temperature be not more than 830° C. and especially not more than 800° C. The use of toroidal bed or fluidized bed reactors is believed to be beneficial in the roasting step, in order to obtain a more uniform amorphous silica product. The vessels in any roasting step herein should be low in content of leachable impurities, especially phosphorus, boron and aluminum, to avoid contamination of the amorphous silica.

In preferred embodiments of the invention, the rice husk ash subjected to the process of the present invention has a loss on ignition (LOI) content of less than about 0.6% by weight, and preferably less than 0.2% by weight. The LOI content is primarily in the form of carbon, such carbon typically being formed during conversion of rice husks into rice husk ash. In addition to the LOI, rice husk ash contains a wide variety of impurities, particularly including phosphorus, boron and aluminum. Such impurities are well known to cause deleterious effects in many end-uses, including in solar cells and other electronic end-uses.

In the process of the invention, the silica-rich phase being rice husk ash (RHA) or silica fume is subjected to a leaching step with an aqueous mineral acid. In the leach, the aqueous mineral acid leaches impurities from the amorphous silica. In order to obtain good surface contact between the mineral acid and the amorphous silica, and hence effective leaching of impurities out of the amorphous silica, the amorphous silica needs to be wettable. Controlled roasting with agitation is believed to provide wettable amorphous silica. A low LOI is believed to be beneficial to leaching of impurities in the amorphous silica. In contrast, a high LOI is believed to be detrimental to wettability, resulting in retention of impurities in the amorphous silica. High surface area facilitates wettability, and it is preferred that the amorphous silica have a high porosity.

Examples of the aqueous mineral acid used in the leach include at least one of hydrochloric acid, sulphuric acid, acetic acid, citric acid, hydrofluoric acid, nitric acid and perchloric acid. The preferred mineral acids are hydrochloric acid and combinations of hydrochloric acid and acetic acid; acetic acid is believed to improve wettability of the amorphous silica. In preferred embodiments of the invention, the mineral acid contains at least one metal chloride selected from the group consisting of alkaline earth metal chlorides and ferric chloride. Examples of the alkaline earth metal chloride are magnesium chloride and calcium chloride. The preferred metal chloride is magnesium chloride.

The leaching or roasting-leaching steps are followed by metallothermic or carbothermic reduction to form an polycrystalline silicon product. The reduction is carried out in the presence of at least one reductant selected from the group consisting of magnesium, calcium, aluminum, carbon black, graphite, coal, coke, char and residual biomass. Metallothermic reduction, especially using magnesium, is understood to be preferential compared to use of carbon for lower reduction temperature, while carbon-bearing materials are preferred for economic reasons. In addition, use of magnesium instead of calcium or aluminum is believed to result in a more limited number of unwanted by-product or phases being formed. This facilitates subsequent separation of silicon by known hydrometallurgical processing steps. The product subjected to the reduction is conveniently in the form of pellets or briquettes, which may be pre-heated to a temperature above about 550° C. In reduction by carbon, temperature may need to be raised above 1600° C.

The metallothermic reduction of the amorphous silica is preferably carried out in the presence of inert gas, especially an inert gas selected from argon and helium. High purity argon is preferred.

The reduced amorphous silica from metallothermic reduction, which is silicon, is preferably subjected to at least one additional leaching step to purify the silicon product obtained. In particular, the additional leaching step is conducted using at least one acid selected from hydrochloric acid, sulphuric acid, acetic acid, citric acid, hydrofluoric acid, nitric acid and perchloric acid. Hydrochloric acid or mixtures of hydrochloric acid and acetic acid are preferred.

In an embodiment of the invention, the rice husks are subjected to a secondary roasting; this secondary roasting is carried out on leached amorphous silica and prior to reduction. The secondary roasting stage is carried out at a temperature of not more than about 750° C. for a period of time, for example from 30 minutes to several hours. Similar to the primary roasting, agitation is preferred. It is understood that additional stages of roasting could be used in conjunction with the processing stages disclosed herein.

In a particularly preferred embodiment of the invention, rice husks are subjected, in sequence, to a primary roasting step, a leaching step and a further (secondary) roasting step. In particular, the process comprises subjecting the rice husks to roasting at a temperature of not more than 850° C. for a first period of time, said temperature and first period of time being selected so that silica obtained is amorphous. The amorphous silica obtained is subjected to a purification step in which the amorphous silica is leached with a lixiviant of aqueous mineral acid. Both of these steps have been described previously. Prior to subjecting the leached rice husks to reduction, the rice husks are subjected to a second roasting at a temperature of not more than 750° C. for a second period of time. This roasting stage is carried out at a temperature of not more than about 750° C. for a period of time, for example from 30 minutes to several hours. In embodiments, the leach residue is melted in the presence of a slag at temperatures above 1410° C., the slag containing at least one agent of the group CaO, $Al_2O_3$, $SiO_2$, MgO, $CaF_2$, and BaO.

The sequence of primary roasting, leaching and secondary roasting is believed to permit improved control of removal of impurities from the amorphous silica, and permit improved removal of impurities in a metallothermic reduction step. Such a step is operated subsequent to the secondary roasting step.

The present invention provides an improved method for the production of silicon, especially by the purification of rice husk or silica fume. The invention utilizes a natural source of material or an industrial by-product, rich in silica for the production of silicon, which has environmental and economical advantages. SoG-Si may be obtained.

The present invention is illustrated by the following examples.

EXAMPLE I

Combustion of the rice husk obtained from India was carried out in a pilot plant scale toroidal bed reactor at a temperature in the range of 800-830° C. to yield rice husk ash with mean particle size of 35 µm and BET surface area 39 m²/g. The ash product was examined under scanning electron microscope and showed porous particle morphology; the porosity is believed to be due to the continuous toroidal motion (agitation) during combustion. The porous particles responded well to purification by acid leaching. Examination of the ash product under XRD showed a characteristic amorphous structure in contrast to crystallinity reported by Banerjee et al (noted above) in muffle furnace-fired rice husk. This is believed to be the effect of the combustion method. Visual inspection of the ash obtained indicated that the distribution of particle size was narrow, which might eliminate a need for product sizing.

EXAMPLE II

The ash obtained in Example I was leached with mineral acid (hydrochloric acid) in a non-boron containing vessel (Teflon™ container). The rice husk ash was leached with 10 wt % HCl for either 1 hour or 4 hours at either 60° C. or 90° C. The leached product was analyzed and the results are shown in Table 1. For the leach at 90° C. for 4 hours, it was found that the boron content was reduced from 50 ppm in the unleached ash to <2 ppm; similarly the phosphorus content was reduced from 1600 ppm to 330 ppm.

TABLE 1

| Impurities (ppm) | Rice husk ash (800-830° C.) | Leached Ash 60° C./ 1 hr | Leached Ash 60° C./ 4 hrs | Leached Ash 90° C./ 1 hr | Leached Ash 90° C./ 4 hrs |
|---|---|---|---|---|---|
| B | 50 | <2 | <2 | <2 | <2 |
| Al | 4000 | 3021 | 3088 | 3091 | 2645 |
| P | 1600 | 342 | 359 | 330 | 340 |
| Cu | 11 | 12 | 42 | 100 | 77 |
| Mn | 294 | 198 | 202 | 196 | 181 |
| Fe | 2400 | 1564 | 1470 | 1499 | 808 |
| Ni | 187 | 121 | 374 | 614 | 442 |
| Ti | 300 | 337 | 281 | 299 | 265 |
| Zn | 30 | 30 | 39 | 37 | 26 |
| Mo | 11 | 6 | 7 | 9 | 5 |
| Cr | 68 | 47 | 64 | 97 | 52 |
| V | 3 | 3 | 3 | 3 | 2 |
| Co | 7 | 4 | 6 | 8 | 6 |
| Na | 1700 | 1330 | 1386 | 1401 | 1324 |
| K | 7900 | 5147 | 5343 | 5280 | 4915 |
| Ca | 3300 | 1894 | 1927 | 1876 | 1706 |
| Mg | 1600 | 973 | 973 | 950 | 885 |
| Ba | 149 | 119 | 129 | 132 | 112 |

EXAMPLE III

Rice husk ash from Example I was subjected to either (i) leaching at 90° C. for 4 hours followed by roasting, or (ii) roasting followed by leaching at 90° C. for 4 hours. In each instance, the roasting was in air at a temperature of 700° C. with a white-looking ash being obtained. For (i), the carbon content in the ash of Example I was reduced from 1.83 wt % to 0.12 wt % and the overall silica content increased from ca. 90 wt % to ca. 97%. The analyses of the starting material (rice husk ash) and the products of each treatment approach are provided in Table 2, showing substantial reduction in the impurities. In particular, the combination of leaching and roasting, with leaching completed prior to the roasting, improves the removal of impurities from the amorphous silica.

TABLE 2

| Sample | Concentration (ppmw) | | | | | | | | | | |
|---|---|---|---|---|---|---|---|---|---|---|---|
| | B | Al | P | Mg | Ca | Fe | Cu | Ni | Cr | K | Na |
| Rice Husk Ash | 50 | 4000 | 1600 | 1600 | 3300 | 2400 | 11 | 187 | 68 | 7900 | 1700 |
| Leached & Roasted | 0.06 | 1814 | 363 | 856 | 1130 | <2 | 7 | 9 | 29 | 2757 | 586 |
| Roasted & Leached | 1.51 | 2386 | 406 | 881 | 1415 | <2 | 10 | 40 | 23 | 3430 | 773 |

EXAMPLE IV

In another series of tests, separate samples (10 grams each) of silica fume collected from dust collection of ferrosilicon production furnaces were subjected to one of the following procedures: (a) leaching with mineral acid (10 wt % HCl) in a non boron containing vessel for 4 hours at 90° C., (b) leaching with 10 wt % HCl for 4 hours at 90° C. followed by one hour roasting in a muffle furnace at 700° C., and (c) roasting at 700° C. for one hour, followed by leaching with 10 wt % HCl at 90° C. for 4 hours. The analysis of the starting material and the products of each treatment approach are provided in Table 3. There was a substantial reduction in the impurities. In particular, the combination of leaching and roasting, with leaching completed prior to the roasting, improves the impurity removal.

TABLE 3

| Sample | B ppm | Al ppm | Ca ppm | K ppm | Mg ppm | Mn ppm | Mo ppm | Fe ppm | P ppm |
|---|---|---|---|---|---|---|---|---|---|
| Silica Fume | <2 | 2153 | 2527 | 7265 | 3004 | 108 | 1 | 1232 | 294 |
| Process (a) (leached) | <2 | 2094 | 2026 | 6149 | 2585 | 91 | 1 | 1059 | <100 |
| Process (c) (leached & roasted) | <31 | 1431 | 575 | 63 | 222 | 0 | 0 | 984 | <125 |
| Process (b) (roasted and leached) | <13 | 1466 | 1640 | 3675 | 3306 | 604 | 3 | 7293 | <52 |

EXAMPLE V

To illustrate the reduction process, mixtures of reactants (rice husk ash (RHA) and Mg) were compacted into pellets or briquettes using a non-contaminating binder (polyvinyl alcohol solution). The amount of the binder was 10-15 wt % of the RHA-reductant mixture. The ratio of reductant (Mg) to RHA was slightly above stoichiometric ratio, with 5 wt % excess reductant. Cylindrical compacts of weight varying between 1.4-3.72 g, a height of 5.15-13.45 mm and a compact diameter of 16.3 mm were made using a compression die and under a force of 3-4 tonnes. The powdered compacts allowed a higher quantity of material to be charged to the furnace, compared with a powder mixture, and material losses to the furnace walls due to passage of inert gas through powder were eliminated. The reduction of the purified white ash was carried out in inert gas atmosphere (argon).

EXAMPLE VI

In a comparative experiment using a process of the prior art, black rice husk ash (BRHA) was directly reduced with magnesium turnings of 99% purity, using 25% excess magnesium, in a sealed crucible and muffle furnace atmosphere. The reduction product obtained was then milled to a size passing −300 μm mesh and leached in HCl at temperature of 70±5° C. for a period of 2 hrs. The black rice husk ash analysed by ICP-MS showed a B and P content of 50 and 1600 ppm respectively and $SiO_2$ content of 90%. The magnesium-reduced black ash analysed by ICP-MS showed a B, P content of <10 ppm (Detection limit of equipment=10 ppm) and P content of 160 ppm respectively. Leach of the reduction mass with HCl analyzed B and P content of <10 ppm and 20 ppm respectively. A summary of the impurity reduction by process step is shown in Table 3.

TABLE 3

| | Concentration (ppmw) | | | | | | | | | | |
|---|---|---|---|---|---|---|---|---|---|---|---|
| Sample | B | Al | P | Mg | Ca | Fe | Cu | Ni | Cr | K | Na |
| RHA | 50 | 4000 | 1600 | 1600 | 3300 | 2400 | 11 | 187 | 68 | 7900 | 1700 |
| After Reduction | <10 | 4700 | 160 | >25% | 1000 | 1900 | 212 | 117 | 16 | 800 | 200 |
| After Leaching | <10 | 2400 | 20 | 1.45% | 200 | 700 | 422 | 81 | 10 | 300 | 100 |

A general reduction in impurity is observed for all the elements of interest except for copper; this apparent contamination was not explained.

EXAMPLE VII

A mixture of purified white RHA (LOI 0.6%) with magnesium granules (98% purity) at $SiO_2$/Mg weight ratios of 54.35:45.65 respectively and corresponding to 5 wt % excess magnesium was made into pellets as described above. The pellets were placed in alumina crucible and the crucible and content placed in the heat zone of a horizontal tube furnace. The process tube was then flushed with high purity argon at the rate of 1 L/min for a period of 10-15 minutes. A heating program was initiated after the argon flush with a preferred rate of 300° C./hr. The argon flow into the process tube during heating was kept to 0.25 L/min. Heating was carried to a temperature of 800° C. and maintained at this temperature for 1 hr after which natural cooling to room temperature was allowed. XRD analysis of the reduction products showed presence of silicon, magnesium silicide ($Mg_2Si$), MgO, and $Mg_2SiO_4$.

EXAMPLE VIII

This example shows two-stage leaching.
Stage I Leaching
The reduction mass obtained in Example VII was milled and passed through Tyler Sieve #48 (i.e. passing 300 μm). 5 grams of this sample were treated with 62.5 mL solution comprising a 4:1 volume ratio of 4M HCl and 25% acetic acid respectively. The solid to liquid ratio in this example correspond to 8% solids or 80 g/L. Leaching was carried out at temperature of 70° C. for a period of 1 hr. A dry residue of 1.84 g (after a deionized water wash and oven drying at 105° C.) was obtained which was fed to the subsequent leaching process step.
Stage II Leaching The 1.84 g residual sample obtained in Stage I leaching was treated with 40 mL solution comprising a 1:9 volume ratio of 4.8% HF and 25% acetic acid respectively at a temperature of 70° C. for a period of 1 hr. A residual 1.64 g of fine grain brownish looking powder was obtained which was analyzed by XRD and ICP-OES methods. The concentration of impurity elements is provided below in Table 4.

TABLE 4

3 Stage Leaching Result
Concentration (ppmw)

| Sample | B | Al | P | Mg | Ca | Fe | Cu | Ni | Cr | K | Na |
|---|---|---|---|---|---|---|---|---|---|---|---|
| Silicon Product | 26 | 1540 | 146 | 10543 | 507 | 561 | 56 | 96 | 196 | 2746 | 659 |

EXAMPLE IX

This example show 3-stage leaching.
Stage I Leaching
The reduction mass obtained in Example VII was milled and passed through Tyler Sieve #200 (i.e. passing 75 µm). 5 grams of this sample were treated with 830 mL solution comprising a 4:1 volume ratio of 4M HCl and 25% acetic acid respectively. The solid to liquid ratio in this example correspond to 0.6% solids or 6 g/L. Leaching was carried out at temperature of 70° C. for a period of 1 hr. The dry residue of 1.70 g was obtained which was fed to the subsequent leaching process step.
Stage II Leaching
The 1.70 g residual sample obtained in Stage I leaching was treated with 85 mL solution comprising a 4:1 volume ratio of 2M $H_2SO_4$ and 25% acetic acid respectively at temperature of 70° C. for a period of 1 hr. A residual 1.65 g of fine grain brownish looking powder was obtained which was fed to the subsequent leaching process step.
Stage III Leaching
The 1.65 g residual sample obtained in Stage II leaching was treated with 82.5 mL solution comprising a 1:9 volume ratio of 4.8% HF and 25% acetic acid respectively at temperature of 70° C. for a period of 1 hr. A residual 1.28 g of fine grain brownish looking powder was obtained which was analyzed by XRD and ICP-OES methods. The concentration of impurity elements is provided in Table 5.

TABLE 5

3 Stage Leaching Result
Concentration (ppmw)

| Sample | B | Al | P | Mg | Ca | Fe | Cu | Ni | Cr | K | Na |
|---|---|---|---|---|---|---|---|---|---|---|---|
| Silicon Product | 27 | 1178 | 156 | 9813 | 258 | 134 | 27 | 83 | 168 | 2556 | 578 |

The 1.28 g residue obtained after stage III leaching was in good agreement with theoretical calculations of the amount of silicon to be obtained based on the initial composition of the reduction mass. Recovery was high. The higher B and P content in the silicon product is believed to be due to contamination.

EXAMPLE X

To assess the effect of initial charge composition on the reduction product that is formed at a given temperature, the initial magnesium contents in the charge were varied at 0, 5, 11.5 and 25 wt % excess; 0% excess corresponds to stoichiometric magnesium-silica composition. The reduction of each batch sample was carried out at 650° C. under argon atmosphere as outlined in Example VII. The phases present in each of the reduction sample were analyzed by powder XRD technique and the quantitative amount of each phase determined by the Reitveld method. The results of the Reitveld quantitative XRD analyses of the samples are summarized in Table 7.

It is seen that the maximum silicon yield of about 72% is achieved for a charge with 5 wt % excess magnesium.

TABLE 7

Effect of excess magnesium on phases
in reduction product at 650° C.

| % Excess Mg | Temp. ° C. | Phases (wt %) | | | | |
|---|---|---|---|---|---|---|
| | | Si | MgO | $Mg_2Si$ | $Mg_2SiO_4$ | $\alpha$-$SiO_2$ |
| 0 | 650 | 15.98 | 63.55 | 12.67 | 7.40 | 0.40 |
| 5 | 650 | 18.38 | 61.08 | 10.37 | 9.84 | 0.33 |
| 11.5 | 650 | 13.00 | 67.00 | 13.60 | 5.60 | 0.80 |
| 25 | 650 | 6.60 | 50.70 | 30.40 | 12.20 | 0.00 |
| Mean Error % | | 0.5 | 1.0 | 0.6 | 0.7 | 0.1 |

EXAMPLE XI

To assess the effect of temperature on the reduction product that is formed at a fixed charge composition (5 wt % excess magnesium), the reduction temperatures of batch samples were varied at selected temperatures between 500-950° C. under argon atmosphere as outlined in Example VII. The phases present in each of the reduction samples were analyzed by powder XRD technique and the quantitative amount of each phase determined by the Reitveld method. The results of the Reitveld quantitative XRD analyses show that the recovery of silicon in the reduction product increases with temperature with maximum yield of 85% at 900° C.

EXAMPLE XII

The effectiveness of reagent type and concentration on the dissolution of the magnesium phases during first stage leaching of the reduction product having an initial charge composition of 5 wt % excess magnesium and reduced at 900° C. was evaluated. The reagent types and their effective concentration that were tested are summarized in Table 8. One (1) gram samples of the homogenized reduction product having total magnesium content of 45.7 wt % was leached with 500 ml each of the test reagents listed in Table 8 for a definite time. Aliquots of the leach solution were taken at fixed time intervals for each test run and the solution analyzed for the magnesium ion concentration by ICP method. The results reveal that reagent type I which is a combination of hydrochloric and acetic acid with effective hydrogen ion concentration of 1M was a better lixiviant than the others, giving 99% removal of magnesium compounds after 15 minutes.

TABLE 8

Leaching reagent type and effective concentration

| | HCl | | $CH_3COOH$ | | |
|---|---|---|---|---|---|
| Reagent Type | Conc. (M) | Volume % | Conc. (M) | Volume % | Effective Conc.(M) |
| I | 1.25 | 80.0 | 4.38 | 20.0 | 1.00 |
| II | 1.25 | 100.0 | 0.00 | 0.0 | 1.25 |
| III | 4.00 | 80.0 | 4.38 | 20.0 | 3.20 |
| IV | 4.00 | 100.0 | 0.00 | 0.0 | 4.00 |

EXAMPLE XIII

A 5 gram and 30 gram reduction product samples having composition of 5 wt % excess magnesium content and reduced at 900° C. were each leached at 6 g/l and 20 g/l respectively using reagent type-1 listed in Table 8 at temperature of 70° C. The weight fraction of dry residue retained after first stage leaching in each case was approximately 32% of the initial sample weight. Each of the residues was further subjected to a second leaching at 20 g/l using a reagent mix of 4.8 wt % HF and 25 wt % $CH_3COOH$ in a volume ratio of 1:9 respectively. The leaching temperature was maintained at 70° C. The weight fraction of dry residue retained after second stage leaching in each case was approximately 81% of the initial sample weight. Chemical composition analyses of the two silicon products gave the range of impurities summarized in Table 9.

TABLE 9

Range of impurities in as produced silicon from rice husk
Concentration (ppmw)

| Impurity | B | Al | P | Mg | Ca | Fe | Cu | Ni | Cr | K | Na |
|---|---|---|---|---|---|---|---|---|---|---|---|
| Range (low-high) | 3-18 | 1265-1581 | 25-73 | 1078-16266 | 276-672 | 534-658 | 0.1-45 | 38-57 | 73-118 | 1477-2803 | 422-753 |

EXAMPLE XIV 5 gram silicon sample from the as-produced silicon powder in Example XIII containing 18 ppmw B and 73 ppmw P was melted together with a slag for further refining. The slag, weighing 7.0 grams, was prepared by blending reagent grade oxides to form a $10Al_2O_3{:}42CaO{:}10MgO{:}38SiO_2$ (wt %) mixture. The mixture was compacted into two disks and loaded with silicon into a magnesia crucible. The crucible was heated to 1500° C. in a vertical tube furnace under high purity argon flow. After holding for two hours, the crucible was withdrawn and quenched in water. A sample of silicon was analyzed and showed P and B levels of 5.5 and 7.5 ppmw respectively. These represent about 93 and 58% reduction in the concentrations of P and B respectively.

EXAMPLE XV

Silica fume containing 97% $SiO_2$, 0.9% $K_2O$, 0.5% MgO, 0.5% Carbon, 0.4% $Al_2O_3$, 294 ppmw P, and below 2 ppmw B was processed under the following conditions to obtain high purity silicon. (a) 100 g of the material was leached in a heated Teflon™ beaker, in 10 wt % HCl solution for four hours, while maintaining solid content at 10%, and temperature at 90° C. (b) The residue was rinsed with de-ionized water, and dried, and then roasted in a muffle furnace under air atmosphere. The temperature of the furnace was held at 700° C. for four hours. (c) A batch of the purified silica fume was mixed with magnesium granules of 98% purity, at a weight ratio of Silica Fume/Mg of 5:4. 2 g of the blended batch was loaded into an alumina tube, which was inserted inside a steel capsule. The reaction cell was then placed inside a muffle furnace and heated at the rate of 5° C./min to 750° C. After 2 hours, the furnace was cooled to room temperature. Quantification of the product composition by XRD and Rietveld method indicated 90% yield for silicon. (d) The reaction products were mildly hand-milled and leached in two steps, first in a mixture of 2M HCl solution that also contained 25% acetic acid and second in a mixture of HF (4.8%) and acetic acid (25 wt %). The residue was washed with de-ionized water and dried for two hours at 110° C. ICP analysis of the silicon product shows the following composition (ppmw); B<3, P 12, Ca 1041, Fe 1203, Al 2255, Ni 40, K 1420, Mg 3637, Cr 9, V 1, Mo 10, Mn 150, Zn 67, As 1, Cd 3.

EXAMPLE XVI 2 gram of the silicon produced under conditions of Example XV was leached at 95° C. with 10 ml of a magnesium chloride/hydrochloric acid lixiviant in which the ratio of $MgCl_2/HCl/H_2O$ was 3:4:4 by weight. The leaching time was 240 minutes; the leaching mixture of silicon and lixiviant was stirred at 400 rpm. The residue obtained from the leach was rinsed with de-ionized water, dried at 110° C. and analyzed using ICP-MS. The analysis showed that the impurities had been reduced to the following levels (in ppmw): B<3, P: 10, Ca: 79, Fe 11, Al 22, Ni 11, K, 0.01, Mg 23, Cr 2, V 1, Mo 0.05, Mn 1, Zn 0.5, As 0.7, Cd 0.02.

The invention claimed is:

1. A process for the production of silicon from a material rich in silica comprising the steps of:
   a) subjecting the material rich in silica to roasting at a temperature of not more than 850° C. for a first period of time, said temperature and first period of time being selected so that silica so obtained is amorphous;
   b) subjecting the amorphous silica obtained in step a) to a purification step in which the amorphous silica is leached with a lixiviant of aqueous mineral acid; and
   c) subjecting the leached amorphous silica obtained in step b) to a second roasting at a temperature of less than 750° C. for a second period of time; followed by a step in which the amorphous silica obtained from step c) is subjected to metallothermic or carbothermic reduction to form crystalline silicon.

2. The process of claim 1 in which step a) is controlled so that the amorphous silica so obtained has a loss on ignition (LOI) of less than 0.6% by weight and so that the amorphous silica is wettable.

3. The process of claim 1 in which the material rich in silica is rice husk or silica fume.

4. The process of claim 3 in which the amorphous silica subjected to the leach of step b) has a loss on ignition of less than 0.2% by weight.

5. The process of claim 1 in which the reduction is a metallothermic reduction carried out in the presence of at least one metal selected from the group consisting of magnesium, calcium, and aluminum.

6. The process of claim 5 in which the metal is magnesium.

7. The process of claim 5 in which the metallothermic reduction is carried out at a temperature sufficient to enable exothermic reaction between the amorphous silica and the reductant metal, said temperature being greater than 550° C.

8. The process of claim 1 in which the reduction is a carbothermic reduction carried out in the presence of at least one agent selected from the group consisting of carbon black, graphite, char, coal, coke, and residual biomass in rice husk.

9. The process of claim 8 in which the carbothermic reduction is carried out at temperatures above 1600° C.

10. The process of claim 5 in which the metallothermic reduction is carried out in the presence of inert gas selected from the group consisting of argon and helium.

11. The process of claim 1 in which the reduced amorphous silica so obtained from reduction is subjected to at least one additional leaching step to purify the silicon product obtained.

12. The process of claim 11 in which the additional leaching step is conducted using at least one acid selected from the group consisting of hydrochloric add, sulphuric acid, acetic acid, citric acid, hydrofluoric acid, nitric acid and perchloric acid.

13. The process of claim 12 in which the leach residue is melted in the presence of a slag at temperatures above 1410° C., said slag containing at least one agent selected from the group consisting of $CaO$, $Al_2O_3$, $SiO_2$, $MgO$, $CaF_2$, and $BaO$.

14. The process of claim 1 in which, in steps a) and c), material subjected to roasting is agitated.

15. The process of claim 1 in which the roasting of step a) is carried out at a temperature of 800-850° C.

* * * * *